United States Patent [19]
Slack et al.

[11] Patent Number: 5,319,053
[45] Date of Patent: Jun. 7, 1994

[54] LIQUID DIPHENYLMETHANE DIISOCYANATE

[75] Inventors: William E. Slack, Moundsville; Hersel T. Kemp, II, New Martinsville, both of W. Va.

[73] Assignee: Miles Inc., Pittsburgh, Pa.

[21] Appl. No.: 116,024

[22] Filed: Sep. 2, 1993

[51] Int. Cl.$^5$ .............................................. C08G 18/72
[52] U.S. Cl. ..................................... 528/48; 528/45; 528/49; 528/55; 528/67; 252/182.22; 560/27
[58] Field of Search ................... 528/45, 48, 49, 55, 528/67; 252/182.22; 560/27

[56] References Cited

U.S. PATENT DOCUMENTS

| | | | |
|---|---|---|---|
| 3,644,457 | 2/1972 | König et al. | 260/453 SP |
| 4,055,548 | 10/1977 | Carleton et al. | 260/77.5 AT |
| 4,115,429 | 9/1978 | Reiff et al. | 260/453 SP |
| 4,118,411 | 10/1978 | Reiff et al. | 260/453 SP |
| 4,160,080 | 7/1979 | Köenig et al. | 528/59 |
| 4,261,852 | 4/1981 | Carroll et al. | 528/59 |
| 4,490,300 | 12/1984 | Allen et al. | 260/453 SP |
| 4,738,991 | 4/1988 | Narayan | 521/124 |
| 4,866,103 | 9/1989 | Cassidy et al. | 521/159 |
| 4,910,333 | 3/1990 | Slack | 560/351 |

FOREIGN PATENT DOCUMENTS 46-199176 12/1971 Japan.

*Primary Examiner*—Maurice J. Welsh
*Attorney, Agent, or Firm*—Joseph C. Gil; Godfried R. Akorli

[57] ABSTRACT

The present invention relates to a stable, liquid MDI prepolymer containing an allophanate-modified MDI, having an NCO content of 12 to 32.5% comprising a reaction product of an aliphatic alcohol and diphenylmethane diisocyanate comprising about 2 to 60% by weight 2,4'-diphenylmethane diisocyanate and less than 6% by weight of the 2,2'-diphenylmethane diisocyanate, and the rest being 4,4'-diphenylmethane diisocyanate.

10 Claims, No Drawings

LIQUID DIPHENYLMETHANE DIISOCYANATE

BACKGROUND OF THE INVENTION

1. Field of the Invention

The present invention relates to liquid diphenylmethane diisocyanates (MDI). More specifically, the present invention relates to liquid, alcohol-based, allophanate-modified diphenylmethane diisocyanate prepolymers and the methods of making and using the same.

2. Brief Description of the Prior Art

Liquid diphenylmethane diisocyanates are generally known in the art. U.S. Pat. No. 3,644,457 discloses room-temperature stable liquid isocyanates derived from one mole of diphenylmethane diisocyanate and 0.1 to 0.3 mols of poly-1,2-propylene ether glycol.

U.S. Pat. No. 4,055,548 discloses liquid isocyanate prepolymer compositions obtained by reacting polymethylene polyphenylisocyanate containing from about 65 to 85 percent by weight of methylene bis(-phenylisocyanate) with a polyoxyethylene glycol having molecular weight of from 200 to 600 in an equivalent ratio 0.0185–0.15:1.

U.S. Pat. No. 4,115,429 and 4,118,411 disclose low temperature (as low as −5 degrees Centigrade) storage stable liquid diphenylmethane diisocyanates which are produced by reacting diphenylmethane diisocyanates having a specified 2,4-isomer content with propylene glycol or poly-1,2-propylene ether glycol.

U.S. Pat. No. 4,261,852 discloses liquid polyisocyanate compositions comprising (a) the reaction product of 90 to 50% by weight of a reaction product of diphenylmethane diisocyanate and a polyoxypropylene diol or triol having hydroxyl equivalent weight of from 750 to 3000, said reaction product having NCO content of from 8 to 26% by weight, and (B) from about 10 to 50% by weight of a diphenylmethane diisocyanate containing from 30 to 65% by weight of diphenylmethane diisocyanate, the remainder being polymethylene polyphenyl polyisocyanate.

U.S. Pat. No. 4,490,300 discloses room temperature stable liquid isocyanates which are derived by reacting diphenylmethane diisocyanate with an aliphatic diol having a pendant aromatic group, e.g., 2-methyl- 2-phenyl-1,3-propanediol or phenyl-1,2-ethanediol.

U.S. Pat. No. 4,490,300 discloses room temperature stable liquid isocyanates which are derived by reacting diphenylmethane diisocyanate with monoallylether of trimethylolpropane.

U.S. Pat. No. 4,738,991 discloses organic polyisocyanates characterized by allophanate linkages which are prepared by reacting an organic polyisocyanate including 2,4- and 4,4-diphenylmethane diisocyanate with poly or monohydric alcohol in the presence of an organo metallic catalyst. The catalyst is then deactivated using a compound such as an inorganic acid, organic acid, organic chloroformate or an organic acid chloride.

U.S. Pat. No. 4,866,103 discloses a polyisocyanate composition for use in producing elastomers in a RIM process, said composition being the product of reacting an alcohol and or thiol having an average functionality of from about 1.5 to about 4 and an average equivalent weight of at least 500 with at least 2 equivalents per hydroxyl and/or thiol equivalent of an organic polyisocyanate including 4,4- and 2,4-isomers of diphenylmethane diisocyanate under such conditions that at least about 20% of the initially formed urethane and/or thiourethane groups are converted to allophanate and/or thioallophanate groups.

Prior art relating to the preparation of allophanates which contain isocyanates are British Patent 994,890 which relates to the reaction of urethane isocyanates with excess diisocyanate either by heat alone or in the presence of a catalyst such as a metal carboxylate, a metal chelate or a tertiary amine, until the isocyanate content is reduced to that which is obtained theoretically when the complete reaction of the urethane groups is achieved.

U.S. Pat. No. 4,160,080 discloses a process for producing allophanate containing aliphatically and/or cycloaliphatically bound isocyanate groups in which compounds containing urethane groups are reacted with polyisocyanates having aliphatic and/or cycloaliphatic isocyanate groups, in the presence of a strong acid. The process is generally conducted at a temperature of from 90° C. to 140° C. for about 4 to 20 hours.

Japanese Patent Application No. 1971-99176 discloses a method of preparing liquid diphenylmethane diisocyanate by reacting diphenylmethane diisocyanate with aliphatic monovalent alcohol.

By the present invention there is provided a novel liquid isocyanate which is derived from the reaction product of a specified isomer composition of diphenylmethane diisocyanate.

SUMMARY OF THE INVENTION

In accordance with the foregoing, the present invention, in the first embodiment encompasses a stable, liquid MDI prepolymer comprising an alcohol-based, allophanate-modified MDI having an isocyanate content of about 12 to 32.5% and characterized in that the allophanate is a reaction product of an aliphatic alcohol and a specified isomer composition of diphenylmethane diisocyanate containing from 2 to 60% by weight 2,4'-diphenylmethane diisocyanate and less than 6% by weight of the 2,2'-diphenylmethane diisocyanate, and the rest being 4,4'-diphenylmethane diisocyanate.

In the second embodiment, the invention encompasses a stable, liquid MDI prepolymer having an isocyanate content of about 5 to 30% comprising a reaction product of (A) the allophanate-modified MDI such as described above, and (B) (i) an organic material containing two or more active hydrogen groups which are hydroxyl groups, primary amine groups, secondary amine groups or a combination thereof, (ii) a low molecular molecular weight diol, or (iii) a combination of (i) and (ii).

Further encompassed by the invention are processes for preparing the above liquid MDI prepolymers. In the process of the invention, the allophanate-modified MDI can be prepared by first pre-reacting the specified diphenylmethane diisocyanate with an aliphatic alcohol to form a urethane which is subsequently converted to an allophanate. Alternately the aliphatic alcohol and the diphenylmethane diisocyanate and the appropriate catalyst can be reacted to form the allophanate directly.

The resultant allophanate-modified MDI having an isocyanate content of about 12 to 32.5% can be reacted with a high molecular weight organic material containing two or more active hydrogen groups which can be hydroxyl, primary amine, secondary amine groups or a combination thereof, having a molecular weight of from 400 to 6000, and/or with a low molecular weight organic material containing two or more hydroxyl groups which are typically diols having a molecular weight of from 60 to 200. The resultant product comprising a stable, liquid MDI prepolymer has an isocyanate group content of from 5 to 30% by weight.

In a preferred embodiment of process of the invention, the the allophanate can be prepared by reacting the specified diphenylmethane diisocyanate with an aliphatic alcohol, at about 20° C. to about 115° C. The resulting urethane is converted to an allophanate at 60°-110° C., using zinc acetylacetonate as catalyst, and benzoyl chloride as a stopper for the catalyst in a 2:1 weight ratio of benzoyl chloride to zinc acetylacetonate.

It is a distinct feature of the invention that the resultant isocyanate prepolymer is stable and liquid at 25° C. By the term "stable" herein is meant that the prepolymer has up to 1% absolute change in the NCO content and up to 10% change in the viscosity when stored at 25° C. for 3 months. By the term "liquid" herein is meant that the prepolymer does not precipitate solids when stored at 25° C. for 3 months.

The liquid isocyanate prepolymers of the invention have been found to be useful in polyurethane applications.

DETAILED DESCRIPTION OF THE INVENTION

The stable, liquid MDI prepolymer of the invention contains an aliphatic alcohol based, allophanate-modified MDI characterized in that it is a reaction product of an aliphatic alcohol and a specified isomer composition of MDI which is effective to produce an MDI prepolymer which is stable and liquid and at once has desirable performance properties. The effective isomer composition of MDI comprises about 2 to 60% and preferably 2 to 25% by weight 2,4'-diphenylmethane diisocyanate and less than 6% and preferably about 0 to 0.7% by weight of the 2-,2'-diphenylmethane diisocyanate, and the rest being 4,4'-diphenylmethane diisocyanate. In the first embodiment of the invention, the allophanate-modified MDI has an NCO content of about 12 to 32.5% and preferably 20 to 31% by weight. In the second embodiment of the invention, the allophanate-modified MDI has an NCO content of about 5 to 30% and preferably 10 to 25%.

Aliphatic alcohols useful herein are those that can react with the diphenylmethane diisocyanate to form allophanates in accordance with the invention. The useful aliphatic alcohols can contain about 1 to 36 and preferably 4 to 16 carbon atoms. Illustrative but non-limiting examples of the aliphatic alcohols can be selected from the group consisting of cycloaliphatic alcohols, aliphatic alcohols containing aromatic groups, aliphatic alcohols containing groups that do not react with isocyanates e.g., ether groups and halogens such as bromine and chlorine. Specific but non-limiting examples of the aliphatic alcohols can be selected from the group consisting of 1-butanol, cetylalcohol, cyclohexanol, 2-methoxyethanol, and 2-bromoethanol.

In accordance with the process of the invention, the allophanate-modified MDI can be prepared as follows. First, a urethane can be prepared by reacting the useful isomer composition of MDI with the aliphatic alcohol at a temperature of 20° to 115° C., followed by the addition of a catalyst to the resulting urethane, at 60° to 120° C., in order to form the allophanate. Alternately, the catalyst and the alcohol can be added together to the MDI at 40°-60° C., and the resulting mixture can be heated to about 60° to 120° and typically at 90° C. to form the allophanate.

The catalyst in the resultant product is typically neutralized before the reaction with organic materials containing hydroxyl groups or amine groups as described herein. As such the catalysts useful herein are those that can be neutralized or otherwise stopped from adversely affecting subsequent reactions.

Illustratively, a catalyst such as zinc acetylacetonate can be employed, and a catalyst stopper such as acidic materials, e.g., anhydrous hydrochloric acid, sulfuric acid, bis(2-ethylhexyl)hydrogen phosphate, benzoyl chloride, Lewis acids and the like in the ratio of 2 equivalents of the acid to each mole of the zinc acetylacetonate. Other allophanate catalysts such as zinc 2-ethylhexanoate, cobalt 2-ethylhexanoate, cobalt naphthenate, lead linoresinate can be employed. Solvents which are typically inert to the isocyanate, for example toluene, tetrahydrofuran or o-dichlorobenzene can be employed.

In the second embodiment of the invention, the resultant allophanate-modified MDI (A), having an isocyanate group content of from 12.0 to 32.5% is reacted with (B) (i) an organic material containing two or more and preferably 2 to 3 active hydrogen groups which can be hydroxyl groups, primary amine groups, secondary amine groups or a combination thereof having a molecular weight of from 400 to 6000, and preferably 1000 to 5000 or (ii) with an organic material preferably containing two or more and preferably two hydroxyl groups, having a molecular weight of from 60 to 200 and preferably 76 to 90 or a combination of (i) and (ii). The resultant isocyanate prepolymer has an isocyanate group content of about 5 to 30% by weight. The urethane, urea, or bioret reaction is carried out in a manner which is well known in the polyurethane chemistry by, say, heating the reactants to a temperature of from about 40 to 150 and preferably 50 to 100 degrees Centigrade to form the urethane or urea and at 100° to 150° C. and preferably 110° to 120° C. to form the biuret.

The useful organic materials containing two or more hydroxyl groups having a molecular weight of 400 to 6000 can be a polyol selected from the group consisting of polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as specific but non-limiting examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane. The polyesters may also contain a portion of carboxyl end groups. Polyesters of lactones, e.g. ε-caprolactone or hydroxy-carboxylic acids, e.g. ω-hydroxycaproic acid, may also be used.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 20% by weight of ethylene oxide units. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Patent No. 1,152,536).

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythis-mixed ethers, polythioether esters or polythioether ester amides, depending on the co-components.

Amine-terminated polyether useful herein can be prepared by reacting a primary amine or ammonia with a polyether containing a terminal leaving group such as halides, or mesylates as disclosed in commonly assigned U.S. patent application Ser. No. 07/957,929, filed on Oct. 7, 1992, or as disclosed in U.S. Pat. Nos. 3,666,726, 3,691,112 and 5,066,824.

Suitable polyacetals include the compounds which can be prepared from aldehydes, e.g. formaldehyde, and glycols such as diethylene glycol, triethylene glycol, ethoxylated 4,4'-dihydroxy-diphenyldimethylmethane, and hexanediol-(1,6). Polyacetals suitable for the purpose of the invention may also be prepared by the polymerization of cyclic acetals.

Suitable polyhydroxy polyester amides and polyamines include the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

The low molecular weight material containing two or more hydroxyl groups having an average molecular weight of 60 to 200 may be used in combination with or instead of the high molecular weight material containing two or more hydroxyl groups. They include the polyhydric alcohols which have previously been described for the preparation of the polyester polyols and polyether polyols. Dihydric alcohols are preferred. The weight ratio of the low molecular weight to the high molecular weight material containing two or more hydroxyl groups can be from 0.001 to 2 and preferably 0.01 to 0.40.

In addition to the above-mentioned components which are preferably difunctional, monofunctional and even small portions of trifunctional and higher functional components generally known in polyurethane chemistry, such as trimethylolpropane, may be used in special cases in which slight branching of the resultant product is desired.

In the process of the invention, the hydroxyl functional material(s) can be reacted with the allophanate over the temperature range of 40° to 150° and preferably 50° to 100° C., over a period of 0.1 to 2 hours. Catalysts and solvents can be employed to aid the reaction. Examples of the useful catalysts can be selected from the group consisting of di-n-butyltin dichloride, di-n-butyltin diacetate, di-n-butyltin dilaurate, triethylenediamine, and bismuth nitrate. Examples of the useful solvents can be selected from the group consisting of dioxane, chlorobenzene, toluene, and tetrahydrofuran.

The liquid isocyanate prepolymer has been found to be particularly useful in the preparation of polyurethanes. This and other aspects of the invention are further illustrated by the following non-limiting examples.

EXAMPLES

The first step in the preparation of these prepolymers is the preparation of the allophanate. The allophanate can be prepared in a two-step process.

First, the urethane is prepared by reacting the aliphatic alcohol and the diphenylmethane diisocyanate (MDI) at 60° C., followed by the addition of catalyst to the resulting urethane in order to form the allophanate. Alternately, the catalyst and the alcohol can be added together to the MDI at 40°–60° C., and the resulting mixture is heated at between 60° and about 90° C. The catalyst in the resultant product is neutralized before the addition of other hydroxy or amino containing compounds. Illustratively, zinc acetylacetonate catalyst, can be neutralized using acidic materials such as anhydrous hydrochloric acid, sulfuric acid, bis(2-ethylhexyl)hydrogen phosphate, benzoyl chloride, Lewis acids and the like in the ratio of 2 equivalents of the acid to each mole of the zinc acetylacetonate.

The combination of diol and polyether polyol or amine terminated polyether can be added to the allophanate in any order.

The following materials were used in the preparation of the prepolymers:

Polyol A: a propylene glycol/propylene oxide adduct having a 2000 molecular weight and a hydroxyl value of 56.

Polyol B: a glycerine/propylene oxide/ethylene oxide adduct with the ethylene oxide being present as a 17% by weight termination, having a 4800 molecular weight and a hydroxyl value of 35.

Polyol C: a glycerine/propylene oxide adduct having a 3000 molecular weight and a hydroxyl value of 56.

Polyol D: propylene glycol/propylene oxide adduct having a 1000 molecular weight and a hydroxyl value of 112.

Polyol E: a glycerine/propylene oxide/ethylene oxide adduct with the ethylene oxide being present as a 13% by weight termination, having a 6000 molecular weight and a hydroxyl value of 28.

AMINE TERMINATED POLYETHER PREPARATION (ATPE)

Polyol D (2.6 eq.), triethylamine (2.91 mole), and 300 ml methylene chloride were added to a 3 liter, 3-neck flask fitted with a stirrer and reflux condenser. Methane sulfonyl chloride (2.91 mole) was added dropwise, keeping the solution temperature at 25° C. with an ice water bath. The reaction solution was stirred at room temperature for 0.5 hours, then neutralized with sodium hydroxide (2.91 mole). Triethylamine, solvent and water were vacuum stripped and the product filtered to give the mesylate as a clear, colorless liquid.

This mesylate (1.9 eq.) was added to a 3 liter, 3-necked flask fitted with a stirrer and reflux condenser. 2-Ethylhexylamine (5.7 mole) was added and the solution was heated at 150° C. for 9 hours. The solution was cooled and neutralized with sodium hydroxide (1.9 mole). Excess amine and water were vacuum stripped and the product filtered to give a clear, light yellow liquid with a viscosity of 105 mPa.s (at 25° C.) and an amine number of 83.0. This ATPE was used in Examples 45 and 46.

PG: propylene glycol
1,3 XB: 1,3-butanediol
MDI-X: Diphenylmethane diisocyanate which contains less than 6% by weight 2,2'-isomer of diphenylmethane diisocyanate and in which X represents the percent by weight 2,4'-isomer of diphenylmethane diisocyanate with the remainder being the 4,4'- and 2,2'-isomers.

Isocyanate A: 100 parts (PBW) of MDI-2 and 1 part of 1-butanol were charged to a stirred reactor and heated to 60° C. 0.01 part of zinc acetylacetonate was added and the stirred reaction mixture was heated to 90° C. After one hour at 90° C. the NCO content was 32.1%. The reaction mixture was cooled to 60° C. and 0.025 part of benzoyl chloride was added. The reaction mixture was cooled to 40° C. and stored at 40° C. until used.

Isocyanates B through I: were prepared in essentially the same manner as described for Isocyanate A. The materials used and the % NCO obtained are set forth in Table 1. The same catalyst and stopper used for Isocyanate A were used for Isocyanates B through I, in the same amounts.

TABLE 1

| Isocyanate | MDI-X | PBW MDI-X | Alcohol Used | PBW Alcohol | NCO Content % by weight |
|---|---|---|---|---|---|
| B | 2 | 100 | 1-butanol | 2.0 | 30.7 |
| C | 2 | 100 | 1-butanol | 3.0 | 29.3 |
| D | 2 | 100 | 1-butanol | 4.7 | 27.0 |
| E | 10 | 100 | 1-butanol | 1.0 | 32.1 |
| F | 10 | 100 | 1-butanol | 2.0 | 30.7 |
| G | 20 | 100 | 1-butanol | 2.0 | 30.7 |
| H | 2 | 100 | methanol | 1.2 | 30.0 |
| I | 15 | 100 | 1-butanol | 4 | 28.0 |

EXAMPLE 1

63.9 parts of Isocyanate A were charged to a reactor and heated to 60° C. 34.2 parts of Polyol B and 1.9 parts of PG were added to the stirred isocyanate at such a rate that the temperature was maintained at 60° C.±5°. The reaction mixture was held at 60° C. for about 2 hours and then cooled to 25° C. The resultant product, which had an isocyanate group content of 17.5%, was a clear liquid and storage stable at 25° C.

EXAMPLES 2 THROUGH 44

Examples 2 through 44 used the process of Example 1. All the products were clear liquids and storage stable at 25° C. The materials used and the percent NCO results obtained were as set forth in Table 2.

EXAMPLE 45

150 parts of Isocyanate I were charged to a reactor and heated to 40° C. 0.033 part of benzoyl chloride was added. 31.8 parts of the ATPE was added over a ten minute period with good stirring. The reaction mixture was held at 50° C. for 12 minutes then cooled to room temperature. The resultant urea modified product, which has an isocyanate group content of 22.0%, and a viscosity of 265 mPas at 25° C. was a clear liquid and storage stable at 25° C.

EXAMPLE 46

Example 45 was repeated except after being heated at 50° C. for 12 minutes, the material was heated up to 120° C. and held for 90 minutes followed by cooling to 25° C. The resultant biuret modified product, which has an isocyanate group content of 20.6% and a viscosity of 780 mPa.s at 25° C., was a clear liquid and storage stable at 25° C.

TABLE 2

| Ex. | Isocyanate Used | PBW Isocyanate | Polyol Used | PBW Polyol | Diol Used | PBW Diol | NCO Content % by weight |
|---|---|---|---|---|---|---|---|
| 2 | A | 64.8 | A | 32.6 | 1,3 XB | 2.6 | 16.9 |
| 3 | A | 68.3 | A | 31.0 | 1,3 XB | 0.7 | 19.9 |
| 4 | B | 60.8 | C | 39.2 | — | — | 17.0 |
| 5 | B | 70.1 | D | 29.9 | — | — | 19.2 |
| 6 | B | 58.7 | B | 39.5 | PG | 1.8 | 15.6 |
| 7 | B | 62.3 | B | 36.5 | 1,3 XB | 1.2 | 17.0 |
| 8 | B | 73.8 | A | 24.7 | PG | 1.5 | 19.8 |
| 9 | C | 83.3 | D | 16.7 | — | — | 22.9 |

TABLE 2-continued

| Ex. | Isocyanate Used | PBW Isocyanate | Polyol Used | PBW Polyol | Diol Used | PBW Diol | NCO Content % by weight |
|---|---|---|---|---|---|---|---|
| 10 | C | 60.8 | E | 39.2 | — | — | 17.1 |
| 11 | C | 81.2 | A | 18.8 | — | — | 22.4 |
| 12 | C | 80.3 | B | 19.7 | — | — | 23.1 |
| 13 | C | 77.2 | A | 21.3 | PG | 1.5 | 20.3 |
| 14 | C | 70.9 | A | 26.3 | PG | 2.8 | 16.5 |
| 15 | D | 94.3 | — | — | 1,3 XB | 5.7 | 20.3 |
| 16 | D | 79.2 | A | 18.4 | PG | 2.4 | 18.0 |
| 17 | D | 79.3 | B | 17.5 | 1,3 XB | 3.2 | 17.8 |
| 18 | D | 76.4 | B | 23.6 | — | — | 20.0 |
| 19 | D | 77.6 | C | 22.4 | — | — | 20.1 |
| 20 | D | 75.9 | E | 24.1 | — | — | 19.9 |
| 21 | E | 66.7 | C | 33.3 | — | — | 20.0 |
| 22 | E | 64.6 | E | 35.4 | — | — | 20.0 |
| 23 | E | 67.0 | B | 29.7 | PG | 3.3 | 17.0 |
| 24 | E | 79.8 | B | 14.6 | 1,3 XB | 5.6 | 20.1 |
| 25 | E | 68.5 | A | 28.1 | PG | 3.4 | 17.0 |
| 26 | F | 69.3 | C | 30.7 | — | — | 20.1 |
| 27 | F | 67.4 | E | 32.6 | — | — | 20.0 |
| 28 | F | 98.0 | — | — | 1,3 XB | 2.0 | 28.3 |
| 29 | F | 77.2 | A | 19.7 | 1,3 XB | 3.1 | 19.9 |
| 30 | F | 76.2 | B | 20.7 | 1,3 XB | 3.1 | 20.1 |
| 31 | G | 79.5 | A | 16.5 | 1,3 XB | 4.0 | 20.0 |
| 32 | G | 81.1 | B | 14.0 | 1,3 XB | 4.9 | 19.8 |
| 33 | G | 78.0 | B | 18.9 | PG | 3.1 | 20.0 |
| 34 | G | 96.2 | — | — | 1,3 XB | 3.8 | 25.8 |
| 35 | G | 69.3 | A | 30.7 | — | — | 20.3 |
| 36 | G | 69.3 | C | 30.7 | — | — | 20.3 |
| 37 | G | 67.4 | E | 32.6 | — | — | 20.1 |
| 38 | H | 79.0 | A | 18.3 | PG | 2.7 | 20.0 |
| 39 | H | 79.0 | A | 17.8 | 1,3 XB | 3.2 | 20.0 |
| 40 | H | 69.3 | B | 27.9 | PG | 2.8 | 16.8 |
| 41 | H | 79.9 | B | 16.9 | PG | 3.2 | 20.1 |
| 42 | H | 67.7 | B | 29.6 | 1,3 XB | 2.7 | 16.8 |
| 43 | H | 78.0 | B | 18.9 | 1,3 XB | 3.1 | 19.9 |
| 44 | C | 100.0 | A | 87.0 | PG | 1.0 | 13.1 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable, liquid MDI prepolymer containing an allophanate-modified MDI, having an NCO content of 12 to 32.5% comprising a reaction product of an aliphatic alcohol and diphenylmethane diisocyanate comprising about 2 to 60% by weight 2,4'-diphenylmethane diisocyanate and less than 6% by weight of the 2,2'-diphenylmethane diisocyanate, and the rest being 4,4'-diphenylmethane diisocyanate.

2. The liquid MDI prepolymer of claim 1 wherein the aliphatic alcohol contains from 1 to 36 carbon atoms.

3. A stable, liquid MDI prepolymer containing an allophanate-modified MDI, having an isocyanate content of about 5 to 30%, comprising a reaction product of (A) the allophanate-modified MDI of claim 1 and (B)(i) a high molecular weight organic material containing two or more active hydrogen groups which are hydroxyl groups, primary amine groups, secondary amine groups or a combination thereof, (ii) a low molecular molecular weight diol, or (iii) a combination of (i) and (ii).

4. The MDI prepolymer of claim 3 wherein the high molecular weight organic material containing two or more active hydrogen groups has a molecular weight of from 400 to 6000, and the low molecular weight diol has a molecular weight of from 60 to 200.

5. A process for preparing a stable, liquid MDI prepolymer containing an allophanate-modified MDI having an NCO content of about 12 to 32.5% comprising reacting an aliphatic alcohol and diphenylmethane diisocyanate comprising from 2 to 60% by weight 2,4'-diphenylmethane diisocyanate and less than 6% by weight of the 2,2'-diphenylmethane diisocyanate, and the rest being 4,4'-diphenylmethane diisocyanate.

6. A process for preparing a liquid MDI prepolymer containing an allophanate-modified MDI having an NCO content of about 5 to 30% comprising reacting (A) an allophanate-modified MDI having an isocyanate content of about 12 to 32.5% which is a reaction product of (i) diphenylmethane diisocyanate comprising 4,4'-diphenylmethane diisocyanate containing from 2 to 60% by weight 2,4'-MDI and less than 6% by weight of the 2,2'-MDI, and (ii) an aliphatic alcohol, with (B) (i) a high molecular weight organic material containing two or more active hydrogen groups which are hydroxyl groups, primary amine groups, secondary amine groups or a combination thereof, (ii) a low molecular weight diol or (iii) a combination of (i) and (ii).

7. The process of claim 6 wherein the aliphatic alcohol contains from 1 to 36 carbon atoms.

8. The process of claim 6 wherein the high molecular weight organic material containing two or more active hydrogen groups has a molecular weight of from 400 to 6000, and the low molecular weight diol has a molecular weight of from 60 to 200.

9. The process of claim 5 wherein the allophanate-modified MDI is prepared at 60°-110° C. in the presence of a zinc acetylacetonate catalyst.

10. The process of claim 9 wherein benzoyl chloride is a stopper for the catalyst.

* * * * *